United States Patent [19]
Dickinson et al.

[11] 3,989,497
[45] Nov. 2, 1976

[54] GLASS MELTING

[75] Inventors: George Alfred Dickinson, Merseyside; William Jackson Rhodes, Prescot, both of England

[73] Assignee: Pilkington Brothers Limited, Merseyside, England

[22] Filed: Apr. 25, 1975

[21] Appl. No.: 571,823

[30]   Foreign Application Priority Data
Apr. 26, 1974   United Kingdom............... 18457/74

[52] U.S. Cl. .................................. 65/135; 65/136; 65/178; 65/342; 65/356
[51] Int. Cl.² ......................................... C03B 5/18
[58] Field of Search ............. 65/134, 136, 342, 343, 65/137, 178, 135, 356

[56]      References Cited
UNITED STATES PATENTS

| | | | |
|---|---|---|---|
| 1,835,690 | 12/1931 | Bowman | 65/343 X |
| 2,888,781 | 6/1959 | Fraser | 65/178 |
| 3,236,618 | 2/1966 | Allman | 65/134 X |
| 3,343,935 | 9/1967 | Keefer et al. | 65/134 X |
| 3,350,187 | 10/1967 | Brichard et al. | 65/134 |
| 3,359,090 | 12/1967 | Hynd | 65/342 X |
| 3,463,627 | 8/1969 | LeBlanc | 65/134 |
| 3,498,778 | 3/1970 | Hynd | 65/178 |
| 3,666,432 | 5/1972 | Kunkle et al. | 65/342 X |
| 3,909,227 | 9/1975 | Dickinson | 65/347 |

*Primary Examiner*—Robert L. Lindsay, Jr.
*Attorney, Agent, or Firm*—Sughrue, Rothwell, Mion, Zinn & Macpeak

[57]      ABSTRACT

In a glass melting tank a water cooled barrier extends horizontally across the forward flow of molten glass to control the forward flow towards the working end and a plurality of stirrers, rotatable in phase with each, are arranged side-by-side across the flow path adjacent the barrier.

11 Claims, 8 Drawing Figures

GLASS MELTING

BACKGROUND OF THE INVENTION

The present invention relates to glass production and more particularly to a glass melting furnace and the operation thereof.

In the manufacture of glass in tank furnaces, unmelted batch is fed onto an established bath of molten glass at one end of the furnace where it is melted, the molten glass, which forms from the batch, passes down the furnace from the melting area, through refining and conditioning zones, and is drawn off from the furnace to be processed in any known manner.

It is difficult in practice to obtain completely homogeneous glass, free from undissolved solids and gases, particularly at high tank loads when time and temperature in a particular zone are limited by furnace design and refractory constraints, the glass produced is generally heterogeneous in composition, to a greater or lesser degree, dependent upon the efficiency with which melting and subsequent operations are accomplished. Glass, varying in composition, forms in layers in the furnace, these layers being subject to convective and other flows imposed by the furnace operation, design and other physical operations carried out on the glass. In general in the final product, the plates are parallel to the glass surfaces but there is deviation from this parallel state in areas which have been subject to the above described modifying conditions. Where the plates cease to be parallel to the faces of the glass optical faults occur which are termed ream.

SUMMARY OF THE INVENTION

We have found that we can modify the flow conditions and can reduce the severity of composition heterogeneity by attenuating and reducing the thickness of the layers of ream. This itself reduces the influence of composition changes on optical quality and furthermore, because the layers are thinner, allows greater freedom of interchange of the glass in adjacent layers by diffusion and so reduces the level of composition differences between the glass layers.

The present invention provides a glass melting tank in which glass forming materials are converted in a continuous process to a glass melt in a melting zone and the melt is subsequently refined in a refining zone prior to reaching a working end of the tank, and discharge to a forming process. The tank has a liquid cooled barrier extending horizontally across at least part of the width of the tank in the path of forward flow towards the working end. The barrier is positioned at a height above the bottom of the tank so as to be located in the upper region of the melt and control the forward flow of molten material to the working end and at least two sitrrers mounted side-by-side across the direction of forward flow within a region adjacent the barrier for rotation about vertical axes. The stirrers are connected to drive means and arranged to stir the melt so that at, at least, one position in each revolution of the stirrers, so that there is no angular difference between the rotational settings of the stirrers. The barrier may be located at or adjacent a waist in the tank.

The stirrers may include blades or paddles. They may be arranged to rotate in the same direction so that the blades or paddles of different stirrers remain parallel to each other during rotation and in this case the stirrers are maintained in phase. If the blades or paddles are rotated in opposite directions they are arranged so that all the blades or paddles become parallel to each other at one predetermined position during each revolution so that there is no difference in rotational setting at that position. Alternatively, the stirrers may comprise cylindrical members, such as cylindrical stalks, which are symmetrical about the axis of rotation. In this case the stirrers do not exhibit differences of rotational setting regardless of their rotational positions. In all cases the stirrers are designed so that they do not impart to the glass a substantial vertical component of glass flow.

Preferably some or all of the stirrers are liquid cooled. Conveniently the liquid used is water.

The barrier may project above the surface of the molten glass, or in some cases it may be desirable for the upper surface of the barrier to lie in the same plane as the surface of the molten glass. The barrier may be in the form of a water cooled pipe extending across at least part of the tank.

The barrier is preferably adjustable in position and preferably is located adjacent the entrance to the waist. It may however in some cases be located within or downstream of the waist. The barrier may extend perpendicular to the direction of flow of the melt through the waist or may be inclined at some other angle to the direction of flow.

Preferably the stirrers are located in the waist at a position downstream from the barrier.

The water cooled barrier in co-acting with the water cooled stirrers to improve the quality of the glass acts as a physical barrier restricting the forward flow which in turn influences the heat transfer between the melting area and the conditioning zone in the working end of the tank.

The heat input to the furnace is limited by the maximum temperatures which the superstructure and regenerator refractories are able to withstand so that the times available for each of the related processes of melting, refining and conditioning, which are dependent on the temperatures in these zones, must be closely controlled if maximum output is to be achieved. Too short a melting time results in partially melted raw materials in the final product; too short a refining time results in an increase in bubble in the glass; and excessive cooling is necessary if the conditioning zone is too short and results in adverse flows within the molten glass with consequential deterioration in optical quality of the glass. In general the furnace is operated so as to achieve compromise conditions, by suitably adjusting the thermal gradients along the furnace so as to permit an overall optimum in glass quality.

The glass forming materials are normally fed into a filling pocket at the melting end of the tank and the downstream limit of the melting zone is determined by the increasing temperature found on moving from the filling pocket through the melting zone. The increase in temperature is controlled by regulation of heating in this part of the tank. On passing beyond the melting zone, a fall in temperature gradient is present as the glass is being refined. The times for melting and refining may be adjusted to suit a particular load by modifying these temperature gradients.

The temperature gradients set up in the tank cause convective flows within the glass. In the refining and conditioning zones the flow is generally forwards and outwards towards the side walls in the upper glass layers and generally backwards and towards the tank centre in the lower layers. The depth of both forward and return flow is dependent on the load and temperature conditions.

By use of the liquid cooled barrier, it is possible to adjust the amount of heat transferred by the glass melt to the conditioning zone. Such adjustment is usually made so as to increase the amount of heat available to the glass for melting and refining and thus restrict the flow of heat into the conditioning zone. Such a change means a consequent reduction in the cooling required to bring the glass in the conditioning zone to the temperature at which it should leave the furnace. Such adjustments as are necessary are usually made in response to a change in load on the tank, i.e., an increase or decrease in the quantity of glass to be produced over a specified period from the tank. The adjustment of the heat transfer between the refining zone and the conditioning zone can be simply done by varying the depth at which the barrier is immersed in the glass at or about the boundary between the two zones. The barrier is placed so as to prevent glass flow across the top of it and the position of its lowermost edge in the glass flow is chosen so as to control the flow of glass beneath and thereby control the quantity of heat transfer between the two zones. To achieve satisfactory operation with different furnace loads, it is desirable for the barrier to be adjustable in vertical position so as to alter its depth of immersion in the glass.

It has been found that by introducing some form of baffle or restriction, e.g. a system of water pipes, in the forward flow of the upper layers of glass, these layers are retarded and that secondary systems of return flow are set up upstream and downstream of the barrier so that in the longer time available to the glass in the surface layers upstream of the barriers, more heat is introduced into the glass and more of this heat is retained in the refining zone by transfer in the increased return flow from the barrier area. At the same time, less heat is transferred from the refining to conditioning zone. By adjusting the depth and design of the barrier it is possible to regulate the flow to satisfy the various limitations imposed by load and temperature.

DESCRIPTION OF THE PREFERRED EMBODIMENTS

Figure 1:
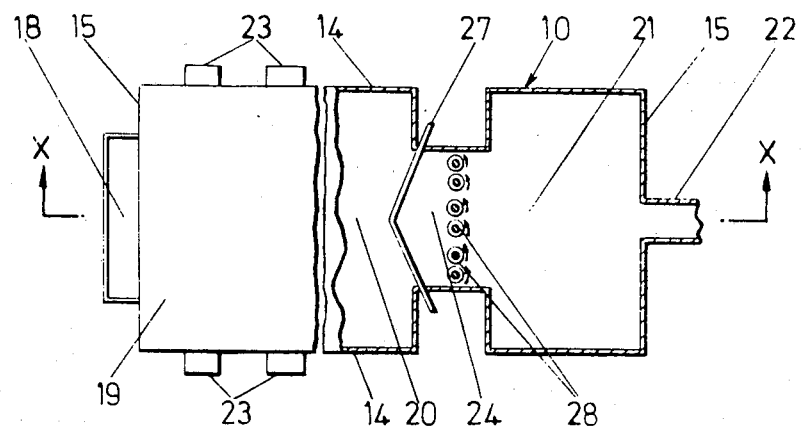
FIG. 1 is a plan view of the furnace showing the preferred location of the barrier and stirring system.
Figure 2:
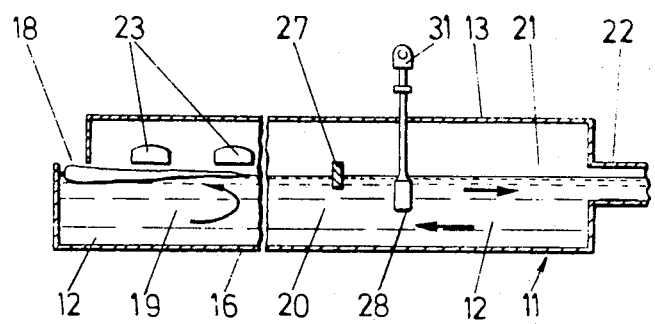
FIG. 2 is a section on the line X—X of FIG. 1.

With reference to the drawings, and more particularly to FIGS. 1 and 2, there is shown a portion of a furnace 10 in accordance with the invention. The furnace comprises an elongated tank 11 for containing molten glass 12. The tank has a crown 13, side walls 14, end walls 15 and a bottom 16 all formed of a suitable refractory material. The batch, from which the glass is to be formed, is fed by a device (not shown) into a melting end through a filling pocket 18 and is melted in the zone 19. The melt is then refined in a refining zone 20 and passes through a waist 24 into a conditioning zone 21 at the working end of the tank in a continuous process. The glass is then discharged through an outlet canal 22 to a forming process. The batch material, fed into the tank 11, floats on the molten glass 12 and is carried thereby through the melting zone 19. Heat for converting the batch to molten glass within the melting zone 19 is provided by burners mounted in or close to ports 23 opening into the melting and refining zones 19 and 20 above the level of the molten glass 12 on opposite sides of the furnace.

Figure 6:
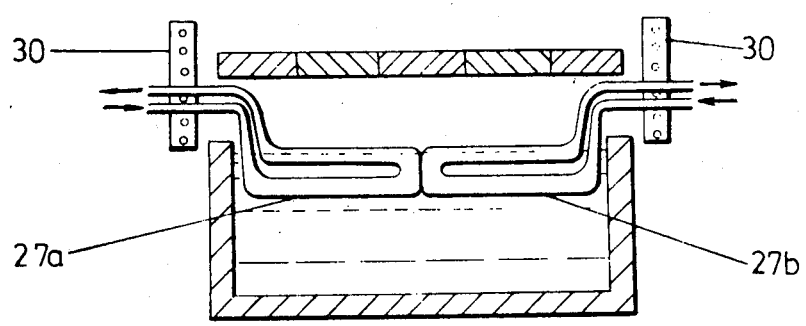
FIG. 6 shows one arrangement of water cooled barrier.

As is shown in FIG. 1, a water cooled barrier 27 is provided at the entrance to the waist 24. This barrier is conveniently in the form of a pair of hairpin water cooled pipes which may for example be as shown in FIG. 6. The pipes are positioned at a height above the bottom of the tank so as to be located in the upper region of forward flow of the melt into the waist region. In this way, the barrier controls the forward surface flow of molten material into the waist. The upper surface of the pipes may in some cases project above the surface of the glass or alternatively the upper surface may lie in the same plane as the glass surface. In order to vary the affect of the barrier on flow into the waist region, the barrier is adjustable in vertical height so as to vay the depth the barrier is submerged in the molten glass. The pipes may be fixed on adjustable supports 30 at either side of the tank as shown in FIG. 6. In the arrangement shown in FIG. 6 the barrier consists of two separate hairpin arrangements 27a and 27b. These project in from opposite sides of the tank. Although in FIG. 6, the upper and lower runs of pipe are shown parallel to each other and to the glass surface, they may be designed so that the lower run is sloped upwards or downwards towards the center of the waist.

Figure 3:
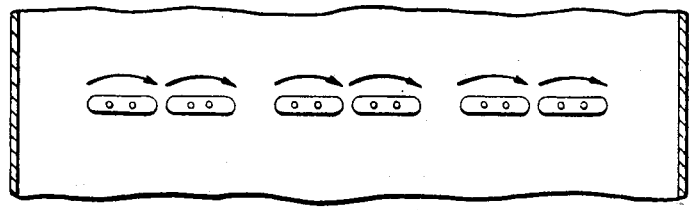
FIG. 3 shows diagrammatically the preferred directions of rotation of the stirrers.
Figure 4:
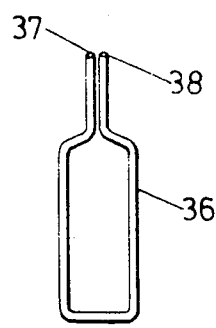
FIG. 4 is a sectional view through one stirrer.
Figure 5:
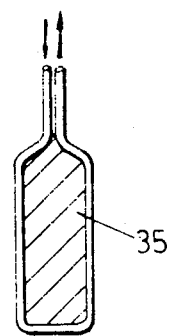
FIG. 5 shows another embodiment of stirrer.

Downstream of the barrier six stirrers 28 are located in the forward flow path through the waist region. The stirrers are arranged side-by-side so as to extend across the waist and as shown in FIG. 2, the stirrers are rotatable about vertical axes by a drive motor 31. In the arrangement shown in this example, each stirrer has a blade or paddle at its lower end the paddle being located in the forward flow of glass and barely extends into the return flow at the bottom half of the tank. As shown in FIG. 3, the blades on each stirrer are arranged parallel to each other and the drive means is arranged so that all the stirrers are rotated in the same direction and at the same speed so that they are maintained in phase with each other. It is possible to use stirrers which have no blades or paddles. In this case the stirrers may be of cylindrical form. The stirrers are water cooled and two alternative constructions are shown in FIGS. 4 and 5. In the arrangement shown in FIG. 4 the stirrer consists of a hollow loop formed by a tube 36 connecting an outlet 37 with an outlet 38. The tube may be formed of stainless steel. FIG. 5 shows the same construction with the space enclosed by the hollow loop filled with a central plate 35, formed of material resistant to attack by molten glass, such as molybdenum.

In both cases cooling water is passed continuously around the hollow tube while the stirrer is rotated.

As is shown in FIG. 1, the barrier extends horizontally across the full width of the waist region of the tank and the two halves of the barrier are inclined to the transverse direction across the tank. In this particular case, the two halves of the barrier are inclined such that the central region of the barrier is located closer to the feeding end of the tank. The barrier may however be arranged at other inclinations and may in some cases extend perpendicular to the direction of flow.

Figure 7:
FIG. 7 illustrates a pattern of inhomogeneity in a sheet of glass formed without stirring and FIG. 8 shows a similar pattern within a sheet of glass after stirring in accordance with the present invention.
Figure 8:

It has been found that the pattern of heterogeneous layers of glass and the difference in intensity or composition between layers is changed to improve the optical quality of the final product by passing the glass in the refining zone 20 into the waisted section 24 of the tank under the water cooled barrier 27 combined with subsequently stirring the forward flowing glass by the water cooled stirrers 28. As previously indicated, the stirrers are rotated so that at, at least one predetermined position in each revolution of the stirrers, there is no difference in their rotational settings. The size of the waisted section, the speed of the stirrers and their depth of operation in the glass is determined by the output and the operating conditions of the furnace. The influence of these operations is most readily seen in the reproduction of the pattern seen through a transverse section of a ribbon of glass taken before and after the stirring operation. These patterns are shown in FIGS. 7 and 8 respectively. As can be ssen, the pattern shown after stirring in FIG. 8 has a much more laminar pattern of ream. In order to maintain the optimum pattern at different tank loads, it is necessary to vary the depth of the water cooled barrier 27 following a change in load.

The type of adjustment that can be achieved by altering the depth and design of barrier can be illustrated by comparing the results achieved with a series of barriers in a glass tank operating at a tank output of 2000 tons per week. The barriers used were:

a. A pair of pipes arranged in a hairpin, the pipes having an outer diameter of 3½ inches and a 3 inch bore, with a 1 inch gap between the legs of the hairpin. The barrier depth was 8 inches. This size of barrier had virtually no effect on the operation of a tank as regards retention of heat in the refining zone.

b. A pair of pipes formed from 5 inch by 2 inch box sections, again with a 1 inch gap thereby providing a barrier depth of 11 inches. Using this configuration it was possible to demonstrate an effect on the working end heat balance. The total heat extracted by the pair of water pipes was 23 therms/hour (roughly equivalent to the heat removed by 1000 cubic meters per hour of cooling air). The reduction in cooling air requirements downstream of the barrier as a result of using the water pipes was about 3000 cubic meters per hour in excess of that simply due to the cooling effect of the barrier, indicating a retention of heat upstream of the barrier.

c. An arrangement similar to (b) but using 7 inch by 2 inch box sections to give a barrier depth of 15 inches. This arrangement did not increase the total heat extracted by the barrier, but did result in a further significant reduction in cooling air required downstream of the barrier. It was also possible to reduce fuel consumption.

Thus by simply altering the dimensions of the pipes used to carry the water one can achieve the variation in depth necessary to meet the various limitations imposed by load and temperature. In altering the depth of the barrier, it is important to ensure that the forward flowing glass passing under the barrier does not also pass under the stirrers, and the position and depth of the stirrers should be adjusted to ensure that all the glass which eventually is discharged to a forming process is stirred.

The fact that the retention of heat in the refining area is dependent in any particular tank on the configuration of barrier is clearly shown by these results.

The invention is not restricted to the details of the foregoing example.

We claim:

1. A glass melting tank in which glass forming materials are converted in a continuous flow process to a glass melt comprising: a melting zone for melting said glass forming materials, a refining zone so that the melt is subsequently refined in said refining zone, a working end of the tank and discharge associated therewith for release of the melt to a forming process, said tank further comprising liquid cooled barrier means extending horizontally across at least part of the width of the tank in the path of forward flow of the melt towards the working end, the barrier means being positioned at a height above the bottom of the tank so as to be located in an upper region of the melt and control the forward flow of molten material to the working end, and at least two stirrers disposed in said tank mounted side-by-side across the direction of forward flow adjacent the barrier for rotation about vertical axes, said stirrers being connected to drive means and arranged to rotate and to stir the melt so that there is substantially no vertical motion imparted to said flow and at, at least, one position in each revolution of the stirrers there is no angular difference between the rotational settings of the stirrers, said stirrers being resistant to erosion effectuated by such melt.

2. A glass melting tank according to claim 1, wherein the tank is provided with a waist between the refining zone and working end and the barrier means is positioned at or adjacent the waist.

3. A glass melting tank according to claim 1, including means associated with the stirrers such that the blades rotate in the same direction as each other and in phase with each other.

4. A glass melting tank according to claim 1, including means to cool the stirrers by water.

5. A glass melting tank according to claim 1, including means to adjust said barrier means in depth of immersion in the molten glass.

6. A glass melting tank according to claim 1, wherein the barrier means comprises at least one water cooled pipe.

7. A glass melting tank according to claim 6, wherein the barrier comprises at least one water cooled U-shaped pipe providing two horizontal arms one extending above the other.

8. A glass melting tank according to claim 2, wherein the barrier is located adjacent the entrance to the waist and the stirrers are positioned in the waist downstream of the barrier.

9. A method of producing molten glass comprising the steps of: feeding glass forming material to one end of a glass melting tank, melting the material in a melting zone of the tank, refining the molten glass in a refining region before the glass passes to a conditioning zone at a working end of the tank from which molten glass is discharged from the tank, said method further including the steps of controlling the forward flow of molten material from the refining zone to the conditioning zone by use of a substantially horizontal barrier through which cooling liquid is passed in the upper region of the melt, and stirring the melt in the waist region by rotation of at least two stirrers about substantially vertical axes, the stirrers being mounted side-by-side across the direction of glass flow and rotated so that there is no vertical motion imparted to said flow and at, at least, one position in each revolution of the stirrers there is no angular difference between the rotational settings of the stirrers.

10. A method according to claim 9 wherein the stirrers are rotated all in the same direction and in phase with each other.

11. A method according to claim 9 including the step of passing cooling water through the stirrers.

* * * * *